A. J. SHUNK.
Corn-Harvesters.
No. 150,196. Patented April 28, 1874.
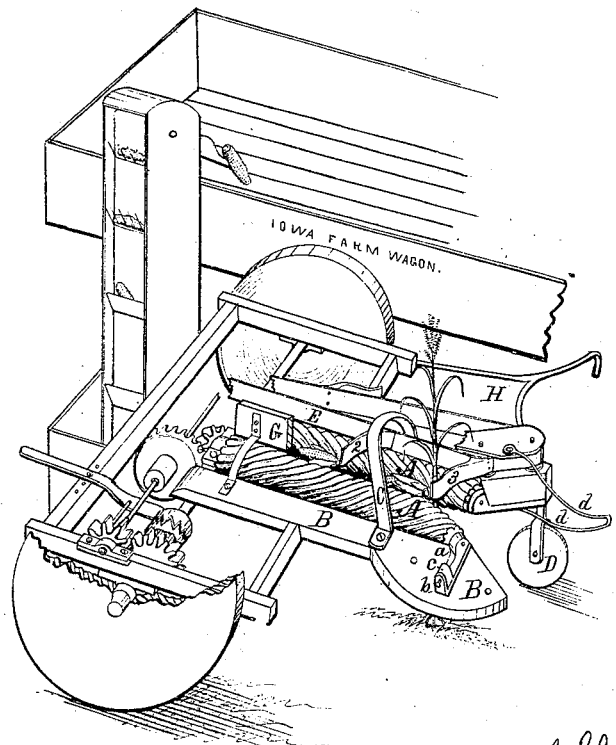
Witnesses.
Geo. Hollaist
J. K. Marsh
Alexander S. Shunk,
Inventor.
Thomas G. Orwig, Attorney.

UNITED STATES PATENT OFFICE.

ALEXANDER J. SHUNK, OF DES MOINES, IOWA

IMPROVEMENT IN CORN-HARVESTERS.

Specification forming part of Letters Patent No. 150,196, dated April 28, 1874; application filed June 6, 1873.

*To all whom it may concern:*

Be it known that I, ALEXANDER J. SHUNK, of Des Moines, in the county of Polk and State of Iowa, have invented a Corn Gathering and Husking Machine, of which the following is a specification:

My invention is a corn-harvester, designed to move through the field and gather and husk the corn from the stalks standing in rows. It consists in mounting spirally-grooved rollers, having conoidal front ends, upon a divided platform, with elastic bearings at their front ends and driving mechanism at their rear ends, and combining therewith tines and endless belts, carrying hands to co-operate with the rollers in accomplishing the results contemplated.

My drawing is a miniature perspective view, illustrating the construction and operation of my invention.

A A represent the pulling and husking rollers. They may vary in diameter and length. They may be cast solid, or the grooved surface may be formed in sections, and attached to a center made of wood or metal in any suitable way. Their conoidal or tapering front ends allow the corn-stalks to enter between them. In their operation they revolve inward, and crush the stalks, and pinch off the corn, and husk it. $a\ b\ c$ are the three separate parts that compose the adjustable and elastic bearings used to mount the front ends of the rollers A A. The part $a$, to which the roller is journaled or pivoted, slides laterally in a groove in the under part $b$. Its left end enters the block $c$ and presses against a spring, which is fitted into a cavity in the block. The part $b$ has a shoulder or elbow on its left end, through which a set-screw passes and enters the block $c$. The spring in the block $c$ may be rubber or metal, and of any suitable form. It allows the rollers A A to spread sufficiently to admit and crush the stalks of varying thickness. By turning the set-screw, the degree of elasticity and the limit of lateral movement can be controlled, and the rollers thereby adjusted to form the precise space that is required between their front ends. The complete adjustable and elastic bearing is attached to the platform by screwing or bolting down the part $b$, or the platform may be cast, and the part $b$ made a part thereof. The rear ends of the rollers A A are mounted in fixed bearings, and connected with the driving mechanism by means of bevel-gear pinions rigidly attached to the ends of their axles or journals. B B represent the right half of the platform, upon which the rollers A A are mounted. The front end is of triangular form, and adapted to support pulleys for moving the endless belts or chains, and to form a capacious mouth that will receive and direct the stalks to the rollers. The rear end of the complete platform is an oblong frame, corresponding in size with the rollers, and is framed to or connected with the carriage in any suitable way. The two separate triangular front parts of the platform are held in position and prevented from spreading by means of the arched yoke C, which is rigidly attached at its base, and stands upward and is open sufficient to allow unrestricted operation of the rollers and belts. The yoke should be wrought or cast metal. The entire platform may be metal, or formed of wood and metal combined. D is an adjustable caster-wheel, attached to the front end of the platform B in any suitable way, and in such a manner that the platform and the front ends of the rollers A may be raised and lowered, and thereby adjusted to suit the elevation of the ears of corn on stalks of different height. $d\ d$ is one of the doubled and bent tines connected with the front part of the platform in any suitable way, and in such a manner that the two used will extend forward and outward to gather lodged and leaning stalks into the forked end or mouth of the platform, which directs them between the rollers A A. E E represent an endless belt or chain, carrying a series of hands or rakes, 1 2 3, mounted in such a manner that the series of hands will aid in bringing the stalks between the rollers, and also at the same time push the loose ears of corn rearward. The belt or chain may be connected with the driving mechanism in any suitable way. G is a guard or fender to aid in retaining the corn on the rollers, and in directing it rearward. An endless belt, E E, may be used on each side of the rollers, and the fender G can then be dispensed with. A truck or any suitable receptacle may be attached in rear of the machine to hold and convey the husked corn. An elevator may be attached to convey the corn from the rollers into a farm-wagon. H is a draft-hook, attached to the front of the machine, and also to the end of the carriage-axle, for the purpose of connecting the machine with a farm-wagon, as represented. The driving mechanism employed to operate the rollers and endless chains consists of common gearing connected with the carriage-wheels.

I am aware that rollers have been placed on a carriage for gathering and husking corn; but I claim that my manner of mounting, combining, and arranging them upon a carriage to advance along and over a row of corn, and separate the corn from the stalks, and convey it to a receptacle, is new and advantageous.

I claim as my invention—

The spirally-grooved and tapered rollers A A, the elastic and adjustable bearings $a\ b\ c$, the divided platform B B, the arched yoke C, the adjustable caster-wheel D, the endless belts carrying a series of hands, 1 2 3, and the tines $d\ d$, when combined and arranged and operated upon a carriage in the manner and for the purpose specified.

ALEXANDER J. SHUNK.

Witnesses:
PERRY PERKINS,
JAMES EMBREE.